US012615226B2

(12) United States Patent
Tselikis et al.

(10) Patent No.: US 12,615,226 B2
(45) Date of Patent: *Apr. 28, 2026

(54) DATABASE SYSTEMS AND RELATED MULTICHANNEL COMMUNICATION METHODS

(71) Applicant: salesforce.com, inc., San Francisco, CA (US)

(72) Inventors: Penny Tselikis, Indianapolis, IN (US); Thomas Besluau, Indianapolis, IN (US)

(73) Assignee: Salesforce, Inc.

( * ) Notice: Subject to any disclaimer, the term of this patent is extended or adjusted under 35 U.S.C. 154(b) by 222 days.

This patent is subject to a terminal disclaimer.

(21) Appl. No.: 18/323,281

(22) Filed: May 24, 2023

(65) Prior Publication Data

US 2023/0306008 A1     Sep. 28, 2023

Related U.S. Application Data

(63) Continuation of application No. 16/526,786, filed on Jul. 30, 2019, now Pat. No. 11,698,891.

(51) Int. Cl.
| | |
|---|---|
| *G06F 16/00* | (2019.01) |
| *G06F 9/451* | (2018.01) |
| *G06F 16/22* | (2019.01) |
| *G06F 16/25* | (2019.01) |
| *H04L 51/04* | (2022.01) |
| *H04L 51/046* | (2022.01) |

(52) U.S. Cl.
CPC ............ *H04L 51/046* (2013.01); *G06F 9/451* (2018.02); *G06F 16/2264* (2019.01); *G06F 16/258* (2019.01); *H04L 51/04* (2013.01)

(58) Field of Classification Search
CPC .... G06F 16/258; G06F 16/2264; G06F 9/451; H04L 51/046; H04L 51/04
See application file for complete search history.

(56) References Cited

U.S. PATENT DOCUMENTS

| | | | |
|---|---|---|---|
| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |

(Continued)

*Primary Examiner* — Jean M Corrielus
(74) *Attorney, Agent, or Firm* — Ingrassia Fisher & Lorenz, LLP

(57) ABSTRACT

Computing systems, database systems, and related methods are provided for managing data pertaining to electronic messages. A database system includes a database including a first object having a plurality of content fields corresponding to a first instance of an electronic message configured for a first communication channel and a server coupled to the database and a network to create a second database object corresponding to a second instance of the electronic message configured for a different communication channel, create a multichannel data structure in the database maintaining an association between the first and second objects, automatically populate a subset of content fields of the second object with values copied from the first object based on a mapping between the two communication channels, and thereafter use the second object to generate a version of the electronic message to be communicated to a recipient using the second communication channel.

20 Claims, 6 Drawing Sheets

(56)                References Cited

U.S. PATENT DOCUMENTS

| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 7,870,492 B2 * | 1/2011 | Mukundan ............. G06Q 10/00 |
| | | 715/749 |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,239,504 B2 * | 8/2012 | Freedman ............... H04L 51/42 |
| | | 709/248 |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,262,452 B2 * | 2/2016 | Arora ...................... G06F 16/22 |
| 9,674,364 B2 * | 6/2017 | Soundar .............. H04M 3/5183 |
| 10,693,922 B2 * | 6/2020 | Linder ................. G06Q 30/016 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0193722 A1 * | 9/2004 | Donovan ................ H04L 69/18 |
| | | 709/206 |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0021973 A1 * | 1/2008 | Manzano .............. H04L 51/066 |
| | | 709/213 |
| 2008/0249972 A1 | 10/2008 | Dillon |
| 2009/0063414 A1 | 3/2009 | White et al. |
| 2009/0100342 A1 | 4/2009 | Jakobson |
| 2009/0150507 A1 * | 6/2009 | Davis ................... H04L 51/214 |
| | | 709/207 |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0179762 A1 * | 7/2012 | Arora ................... G06Q 10/107 |
| | | 709/206 |
| 2012/0218958 A1 | 8/2012 | Rangaiah |

(56)          References Cited

U.S. PATENT DOCUMENTS

| | | | |
|---|---|---|---|
| 2012/0233137 A1 | 9/2012 | Jakobson et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2013/0290869 A1* | 10/2013 | Mencke | H04L 51/23 |
| | | | 715/752 |
| 2014/0289271 A1* | 9/2014 | Oblucki | G06Q 30/02 |
| | | | 707/769 |
| 2016/0103702 A1* | 4/2016 | Schneider | G06F 16/25 |
| | | | 718/101 |
| 2016/0197872 A1* | 7/2016 | Khattar | G06Q 10/101 |
| | | | 709/206 |
| 2016/0283947 A1* | 9/2016 | Yip | G06Q 50/01 |
| 2017/0187671 A1* | 6/2017 | Cue | H04W 4/12 |
| 2017/0295184 A1* | 10/2017 | Kurian | G06F 16/258 |
| 2017/0315680 A1* | 11/2017 | Yip | G06Q 50/01 |
| 2017/0324746 A1* | 11/2017 | Kurian | G06F 16/258 |
| 2018/0268154 A1* | 9/2018 | Specht | G06F 16/176 |
| 2019/0065016 A1* | 2/2019 | Vasudev | G06F 16/252 |
| 2019/0155938 A1* | 5/2019 | Kudriavtsev | G06F 16/27 |
| 2022/0374258 A1* | 11/2022 | Azeem | G06F 16/27 |
| 2023/0306008 A1* | 9/2023 | Tselikis | G06F 16/2264 |

* cited by examiner

DATABASE SYSTEMS AND RELATED MULTICHANNEL COMMUNICATION METHODS

CROSS-REFERENCE TO RELATED APPLICATION(S)

This application is a continuation of U.S. patent application Ser. No. 16/526,786, filed Jul. 30, 2019, the entire contents of which are incorporated by reference herein.

TECHNICAL FIELD

Embodiments of the subject matter described herein relate generally to cloud computing and database systems, and more particularly, to database systems and methods that support creating and managing messages formatted for different communications channels.

BACKGROUND

Modern software development is evolving away from the client-server model toward network-based processing systems that provide access to data and services via the Internet or other networks. In contrast to traditional systems that host networked applications on dedicated server hardware, a "cloud" computing model allows applications to be provided over the network "as a service" or "on-demand" by an infrastructure provider. The infrastructure provider typically abstracts the underlying hardware and other resources used to deliver a customer-developed application so that the customer no longer needs to operate and support dedicated server hardware. The cloud computing model can often provide substantial cost savings to the customer over the life of the application because the customer no longer needs to provide dedicated network infrastructure, electrical and temperature controls, physical security and other logistics in support of dedicated server hardware.

Multi-tenant cloud-based architectures have been developed to improve collaboration, integration, and community-based cooperation between customer tenants without sacrificing data security. Generally speaking, multi-tenancy refers to a system where a single hardware and software platform simultaneously supports multiple user groups (also referred to as "organizations" or "tenants") from a common data storage element (also referred to as a "multi-tenant database"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application features between multiple sets of users. For example, a multi-tenant system may support an on-demand customer relationship management (CRM) application that manages the data for a particular organization's sales staff that is maintained by the multi-tenant system and facilitates collaboration among members of that organization's sales staff (e.g., account executives, sales representatives, and the like).

One situation that arises in a CRM context occurs when it is desirable to communicate substantially the same information to multiple different individuals. However, different individuals will often prefer to utilize different modes of communication or otherwise be less responsive to different modes of communication. For example, some individuals may prefer e-mail, while others prefer text messages, and so on. At the same time, individuals may also prefer to receive fewer communications or limited points of contact, such that there are also risks of frustrating, overwhelming, or otherwise interfering with individuals in a manner that could potentially be detrimental. Thus, the task of communicating the desired information to multiple different individuals in accordance with their respective communications preferences can be difficult, cumbersome and time-consuming. Accordingly, it is desirable to provide systems and methods that facilitate communicating to multiple intended recipients in an improved manner.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
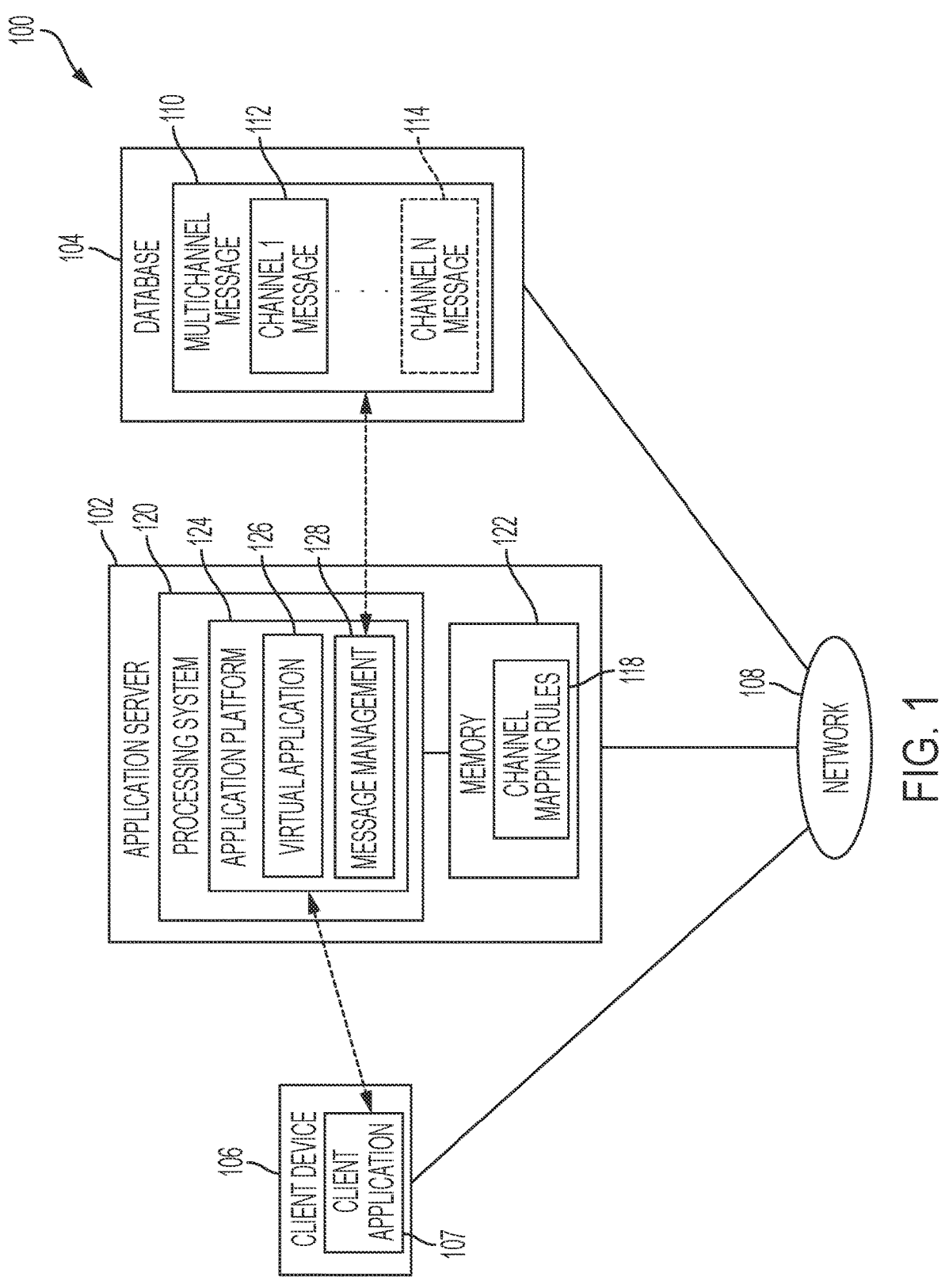
FIG. 1 is a block diagram of an exemplary computing system.

Embodiments of the subject matter described herein generally relate to database systems and methods for communicating information to different individuals via different communications channels. In this regard, a communication channel should be understood as referring to a particular manner of communication, which is independent of the communications network or medium used to transport the information being communicated. By way of example, electronic mail (or email), text messaging, short message service (SMS) messaging, over-the-top (OTT) messaging, line messaging, push notification messaging, application-based messaging, and social media messaging represent a non-exclusive, non-exhaustive, and non-limiting list of different potential communications channels. As described in greater detail below, exemplary embodiments described herein support a multichannel data structure that is maintained in a database and utilized to manage the data or content for an individual electronic message with respect to the different communications channels that may be available. In this regard, the multichannel data structure may associate different instances of an electronic message that are formatted or otherwise configured for transmission via different communications channels, which, in turn, may be utilized to communicate substantially the same message content to different individuals via their respectively preferred communications channels.

For example, a database system may obtain (e.g., from a user creating or defining a message) metadata for content fields of an initial instance of an electronic message to be configured with a particular data format associated with a particular communication channel of interest. An instance of a multichannel data structure may be instantiated in the database for that message, with the multichannel data structure including or otherwise being associated with the metadata for the content fields for the data format associated with the initial communication channel of interest. Thereafter, one or more other different communication channels of interest (alternatively referred to herein as destination communication channels) for that message may be identified, for example, by the user that created or otherwise defined the electronic message configured for the initial communication channel of interest identifying other communication channels for which the user would like the message to be supported. In response, the database system copies or otherwise maps a subset of the metadata for the content fields for the data format associated with the initial communication channel of interest to a corresponding subset of content fields for the different data format(s) associated with the identified destination communication channel(s) that are common or otherwise correspond to content fields of the initial communication channel data format. The database system then automatically creates instance(s) of the electronic message configured in the respective data format(s) associated with the destination communication channel(s) that include the copied metadata from the multichannel data structure for the content fields of the destination communication channel data format(s) that are common to or otherwise correspond to content fields of the initial communication channel data format. In this regard, the user does not need to manually create or define different instances of substantially the same content or message for each different communication channel that the user would like supported.

Thereafter, to transmit a message to multiple different individuals, in some embodiments, the multichannel data structure may be referenced in a manner that allows the database system to automatically identify the preferred supported communication channel for each individual on an individualized and case-by-case basis before transmitting the appropriate instance of the electronic message maintained by the multichannel data structure to each of the intended recipients via the respective communication channel that is preferred for the respective recipient. Thus, by using the multichannel data structure, the effectiveness, reach, or impression of the message may be improved in an automated manner while also having the message content homogenized across different communication channels and recipients.

FIG. 1 depicts an exemplary embodiment of a computing system 100 capable of managing multichannel messages using a multichannel message data structure 110 in a database 104. The computing system 100 includes, without limitation, a server 102 that is communicatively coupled to the database 104 and one or more client devices 106 over a communications network 108. The communications network 108 may be realized as any sort or combination of wired and/or wireless computer network, a cellular network, a mobile broadband network, a radio network, the Internet, or the like. It should be noted that FIG. 1 is a simplified representation of a computing system 100 for purposes of explanation and is not intended to be limiting. For example, in practice, multiple instances of client devices 106 communicating on the network 108 and/or with the server 102 may be present. Additionally, practical implementations may include multiple instances of the server 102 and/or the database 104, which, in turn may reside behind or rely on one or more load balancers to manage resource utilization, as will be appreciated in the art.

The server 102 generally represents a computing device, computing system or another combination of processing logic, circuitry, hardware, and/or other components configured to support the processes, tasks, operations, and/or functions described herein. In this regard, the server 102 includes a processing system 120, which may be implemented using any suitable processing system and/or device, such as, for example, one or more processors, central processing units (CPUs), controllers, microprocessors, microcontrollers, processing cores and/or other hardware computing resources configured to support the operation of the processing system 120 described herein. The processing system 120 may include or otherwise access a data storage element 122 (or memory) capable of storing programming instructions for execution by the processing system 120, that, when read and executed, cause processing system 120 to support the processes described herein. Depending on the embodiment, the memory 122 may be realized as a random-access memory (RAM), read only memory (ROM), flash memory, magnetic or optical mass storage, or any other suitable non-transitory short or long-term data storage or other computer-readable media, and/or any suitable combination thereof.

In one or more embodiments, the programming instructions cause the processing system 120 to create, generate, or otherwise facilitate an application platform 124 that is capable of supporting, generating, or otherwise providing instances of a virtual application 126 at run-time (or "on-demand") based at least in part upon code and other data that is stored or otherwise maintained by the database 104, such that the server 102 functions as an application server 102. In exemplary embodiments, the programming instructions also cause the processing system 120 to create, generate, or otherwise facilitate a message management application 128 that supports creating and managing multichannel messages, as described in greater detail below. Depending on the embodiment, the message management application 128 can be integrated with or otherwise incorporated as part of a virtual application 126, or be realized as a separate or standalone component that is capable of interacting with the client device 106 independent of any virtual application 126.

The client device 106 generally represents an electronic device coupled to the network 108 that may be utilized by a user to access the application platform 124 on the application server 102 to thereby access instances of virtual applications 126 supported by the application server 102 and/or retrieve data from the database 104 via the network 108. In practice, the client device 106 can be realized as any sort of personal computer, mobile telephone, tablet or other network-enabled electronic device. In exemplary embodiments, the client device 106 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 106. The illustrated client device 106 executes or otherwise supports a client application 107 that communicates with the application platform 124 on the server 102 using a networking protocol. In some embodiments, the client application 107 is realized as a web browser or similar local client application executed by the client device 106 that contacts the application server 102 and/or application platform 124 using a networking protocol, such as the hypertext transport protocol (HTTP) or the like.

In one or more embodiments, a user utilizes a browser application 107 to access or otherwise retrieve a computer file, such as a HyperText Markup Language (HTML) file corresponding to a web page that is generated by the application server 102 and/or the application platform 124 as part of an instance of a virtual application 126 generated at run-time (or "on-demand") based at least in part on data stored or otherwise maintained by the database 104 that is communicatively coupled to the server 102 via the communications network 108. It should be noted that although one or more embodiments may be described herein in the context of a web page integrated in a virtual application in an on-demand database system, the subject matter is not necessarily so limited, and in practice, may be implemented in an equivalent manner in any number of different database systems, cloud computing systems, and the like, and in the context of any type of document, computer file or other resource provided by a server that includes, presents, or otherwise displays elements at a client device over a network.

In exemplary embodiments, the database 104 includes one or more data storage elements configurable to store or otherwise maintain data for integration with or invocation by a virtual application in objects organized in object tables. In this regard, the database 104 includes a plurality of different object tables configured to store or otherwise maintain alphanumeric values, metadata, or other descriptive information that define a particular instance of a respective type of object associated with a respective object table. For example, the virtual application may support a number of different types of objects that may be incorporated into or otherwise depicted or manipulated by the virtual application, with each different type of object having a corresponding object table that includes columns or fields corresponding to the different parameters or criteria that define a particular instance of that object. In one embodiment, the database 104 stores or otherwise maintains application objects (e.g., an application object type) where the application object table includes columns or fields corresponding to the different parameters or criteria that define a particular application 126 capable of being generated or otherwise provided by the application platform 124 on a client device 106. In this regard, the database 104 may also store or maintain graphical user interface (GUI) objects that may be associated with or referenced by a particular application object and include columns or fields that define the layout, sequencing, and other characteristics of GUI displays to be presented by the application platform 124 on a client device 106 in conjunction with that application 126. Additionally, the database 104 stores or otherwise maintains additional database objects for association and/or integration with the application 126. The database 104 also stores or otherwise maintains metadata, which may be utilized to perform data manipulation and/or formatting. For example, the metadata may include or define describe any number of workflows, process flows, formulas, business logic, structure and other database components or constructs that may be associated with a particular application database object.

Still referring to FIG. 1, in exemplary embodiments, the database 104 supports a multichannel message data structure 110 that maintains associations between any number of different instances of message objects 112, 114 that are formatted or otherwise configured for communication via different communication channels. For example, a first message object 112 may have particular number and type of content fields corresponding to the standard message format or communications protocol for a first communication channel (e.g., email) which include the different metadata parameters or criteria that define the content and/or structure of the resulting message to be communicated via that communication channel, while another message object 114 corresponding to a different communication channel (e.g., SMS) having a different standard data format or communications protocol will have a different number and type of content fields that define the content and/or structure of the resulting message for that communication channel.

As described in greater detail below in the context of FIG. 2, in the illustrated embodiment, the message management application 128 utilizes channel mapping rules 118 to automatically map a subset of the metadata for the content fields of one communication channel data format to a common subset of content fields of another communication channel data format and automatically instantiate or otherwise create a corresponding instance of the message in that communication channel data format, for example, by creating a new message object 114 and copying the metadata from the content fields of the existing message object 112 to the common content fields of the new message object 114. In this regard, the message management application 128 is capable of converting or otherwise translating the content of a message defined for one communication channel into the appropriate format for any number of other communication channels in an automated manner using the channel mapping rules 118. It should be noted that although FIG. 1 depicts the channel mapping rules 118 being maintained in the memory 122 at the server 102, in other embodiments, the channel mapping rules 118 may be stored or otherwise maintained in the database 104 and obtained or otherwise retrieved by the message management application 128 from the database 104.

Figure 2:
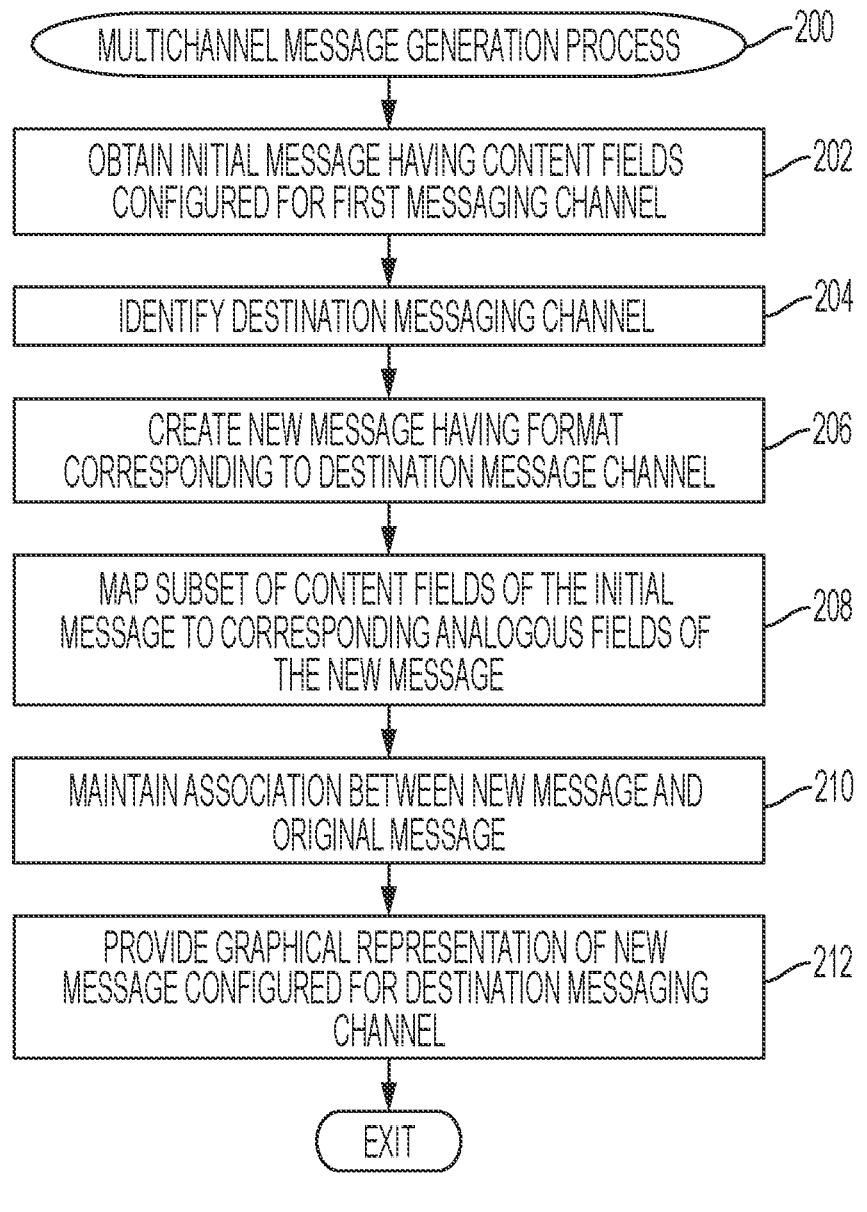
FIG. 2 is a flow diagram of an exemplary multichannel message generation process suitable for implementation in the computing system of FIG. 1 in accordance with one or more embodiments.

FIG. 2 depicts an exemplary embodiment of a multichannel message generation process 200 for supporting different instances of substantially the same message content across multiple different communication channels using a database system. For illustrative purposes, the following description may refer to elements mentioned above in connection with FIG. 1. While portions of the multichannel message generation process 200 may be performed by different elements of the computing system 100, for purposes of explanation, the subject matter is described herein in the context of the multichannel message generation process 200 being primarily performed by the server 102 and/or the database 104. It should be appreciated that the multichannel message generation process 200 may include any number of additional or alternative tasks, the tasks need not be performed in the illustrated order and/or the tasks may be performed concurrently, and/or the multichannel message generation process 200 may be incorporated into a more comprehensive procedure or process having additional functionality not described in detail herein. Moreover, one or more of the tasks shown and described in the context of FIG. 2 could be omitted from a practical embodiment of the multichannel message generation process 200 as long as the intended overall functionality remains intact.

Referring to FIG. 2, with continued reference to FIG. 1, the multichannel message generation process 200 initializes or otherwise begins by receiving or otherwise obtaining an initial version of an electronic message having content fields that are formatted or otherwise configured for transmission or communication via a first messaging communication channel (task 202). In exemplary embodiments, the initial version of the electronic message functions as a template message for communicating substantially the same message content to multiple different recipients. For example, in some embodiments, the application platform 124 and/or message management application 128 may generate or otherwise provide, within the client application 107 at the client device 106, a graphical user interface (GUI) display that allows a user to input or otherwise define the properties and content of an electronic message suitable for communication via a selected messaging communication channel. In this regard, the user may interact with the GUI elements presented within the GUI display to indicate or otherwise select email as the desired messaging communication channel and then input or otherwise define the metadata for the different content fields (e.g., the email subject, the message body, and the like) that provide the content for the email. In other embodiments, the application platform 124 and/or message management application 128 may retrieve or otherwise identify an existing message object in the database 104 for which multichannel support is desirable.

The multichannel message generation process 200 continues by determining or otherwise identifying a destination messaging communication channel for which to convert the original message (task 204). In some embodiments, the destination messaging communication channel may be input, indicated, or otherwise selected by a user of the client device 106 (e.g., from within the GUI display presented within the client application 107), while in other embodiments, the destination messaging communication channel may be automatically identified by the server 102 and/or the database 104. For example, in some embodiments, the multichannel message generation process 200 may be performed in real-time or at run-time to convert a message for purposes of communicating with one or more individuals via a respectively preferred messaging communication channel when a version of the message configured for that desired channel does not already exist.

After identifying the desired destination channel, the multichannel message generation process 200 continues by generating, creating, or otherwise instantiating a new instance of the message that is formatted or otherwise configured in accordance with the destination communication channel, copying, mapping, or otherwise translating common metadata from a subset of content fields of the original message to corresponding content fields of the new message (tasks 206, 208). In this regard, the application platform 124 and/or the message management application 128 create a new instance of a message object 114 in the database 104 that is associated with the destination messaging communication channel and includes content fields that are arranged, configured, or otherwise formatted in accordance with the destination messaging communication channel. The application platform 124 and/or the message management application 128 then automatically populates content fields of the new message object 114 that are analogous to, common to, or otherwise correspond to a subset of content fields of the original message object 112 with the metadata values from those content fields of the initial message object 112, for example, by copying the metadata values over from the initial message object 112 to the appropriate fields of the new message object 114.

In exemplary embodiments, the application platform 124 and/or the message management application 128 utilizes the channel mapping rules 118 to identify which content fields of an initial message object 112 configured for an initial messaging communication channel logically map to corresponding content fields of the new message object 114 configured for the destination messaging communication channel. For example, the channel mapping rules 118 may specify that the subject line field of an email message object maps to the title field of a push notification message object while the body field of the email message object maps to a text field of a push notification message object. In some embodiments, the channel mapping rules 118 may be static or otherwise predefined by a user. In other embodiments, the channel mapping rules 118 may be dynamically determined based on subsequent changes or edits to the newly instantiated message object using machine learning or other artificial intelligence techniques. For example, if users continually move a copied or mapped metadata value from the originally mapped content field of new message objects for a particular destination communication channel to a different content field of those message objects, over time, the channel mapping rules 118 may dynamically update to subsequently map metadata values from future instances of the initial message object to the user-preferred content field for that destination communication channel in lieu of the originally mapped content field.

Still referring to FIG. 2, after mapping common metadata to the new version of the message configured for the identified destination messaging communication channel, the multichannel message generation process 200 maintains an association between the initial version of the message and the newly converted version of the message using a multichannel data structure (task 210). For example, the application platform 124 and/or the message management application 128 may instantiate or otherwise create a new instance of a multichannel message data structure 110 that maintains an association between a unique identifier assigned to the initial message object 112 and a unique identifier assigned to the new message object 114. Additionally, the multichannel message data structure 110 may maintain data or other information that tracks or otherwise indicates the currently supported messaging communication channels associated with the respective message objects 112, 114 associated with the multichannel message data structure 110. In this regard, the multichannel message data structure 110 functions as a higher level container for different versions of substantially the same message content configured for different messaging communication channels. The multichannel message data structure 110 may be assigned one or more unique identifiers that may be subsequently utilized by a user and/or the application platform 124 to identify the multichannel message data structure 110 based on its associated content independent of any particular messaging communication channel. For example, a user may identify the message that he or she would like to be communicated to another individual using an identifier that indicates the multichannel message data structure 110, with the application platform 124 and/or the message management application 128 subsequently determining which messaging communication channel and corresponding message object 112, 114 should be utilized based on the recipient or other factors, as described in greater detail below in the context of FIG. 5.

Still referring to FIG. 2, in one or more embodiments, the multichannel message generation process 200 generates or otherwise provides a graphical representation of the newly created message configured for the identified destination messaging communication channel (task 212). For example, after converting the original message from the initial communication channel format to the destination messaging communication channel format by mapping the common metadata from fields of the initial message object 112 to the analogous content fields of the new message object 114, the application platform 124 and/or the message management application 128 may update the GUI display presented at the client device 106 to depict a graphical representation of the new message object 114 as it would be constructed or presented upon receipt via the destination messaging communication channel. A user may then review the manner in which metadata was mapped from the original message to the new communication channel format and make modifications, additions, or other edits to the content fields of the new message object 114 as desired. It should be noted that the multichannel message generation process 200 as many times as desired with respect to a particular message to map the message to any number or type of different messaging communication channels.

Figure 3:
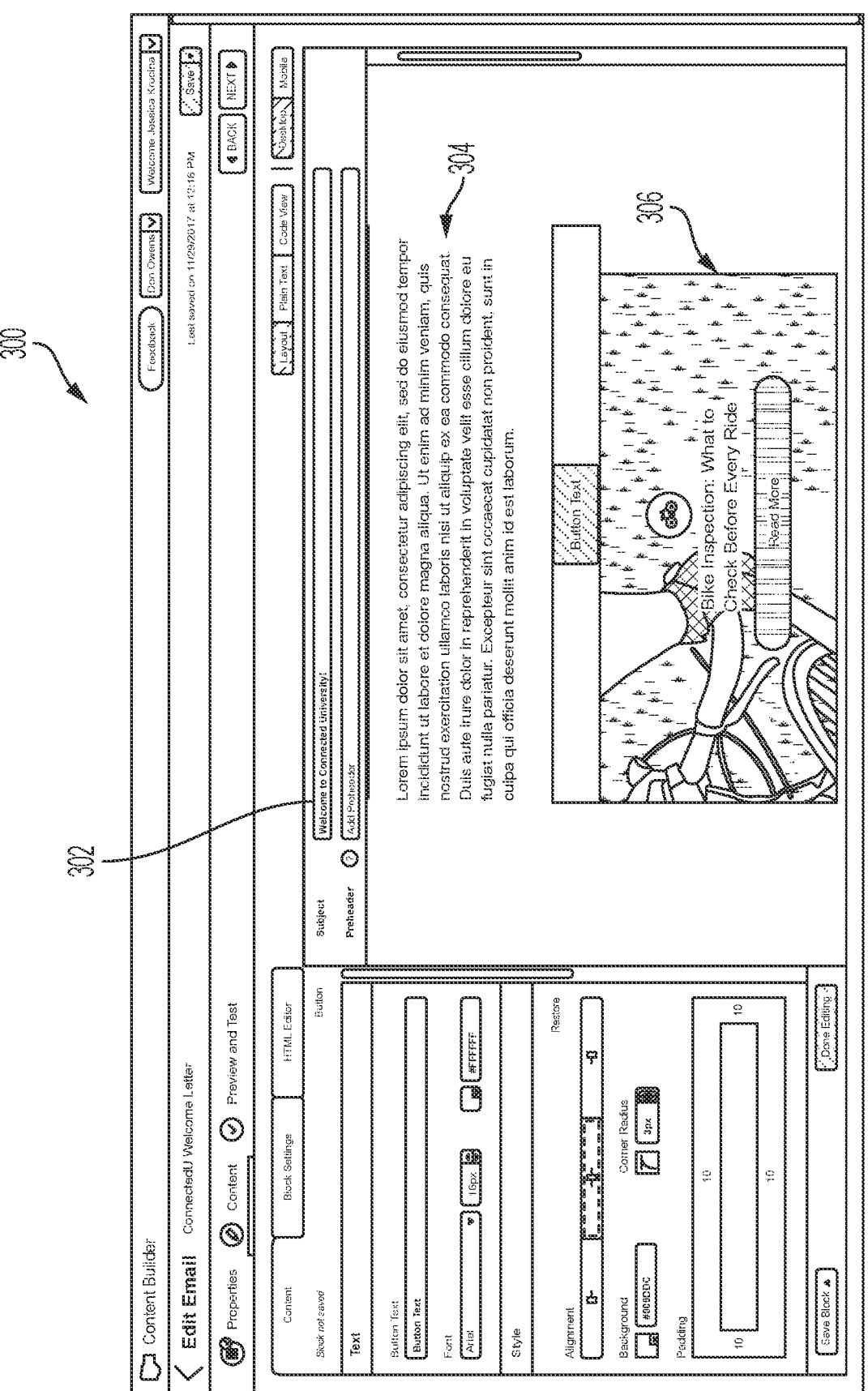
FIGS. 3-4 depict exemplary graphical user interface (GUI) displays suitable for presentation on a client device in the computing system of FIG. 1 in connection with an exemplary embodiment of the multichannel message generation process of FIG. 2.
Figure 4:
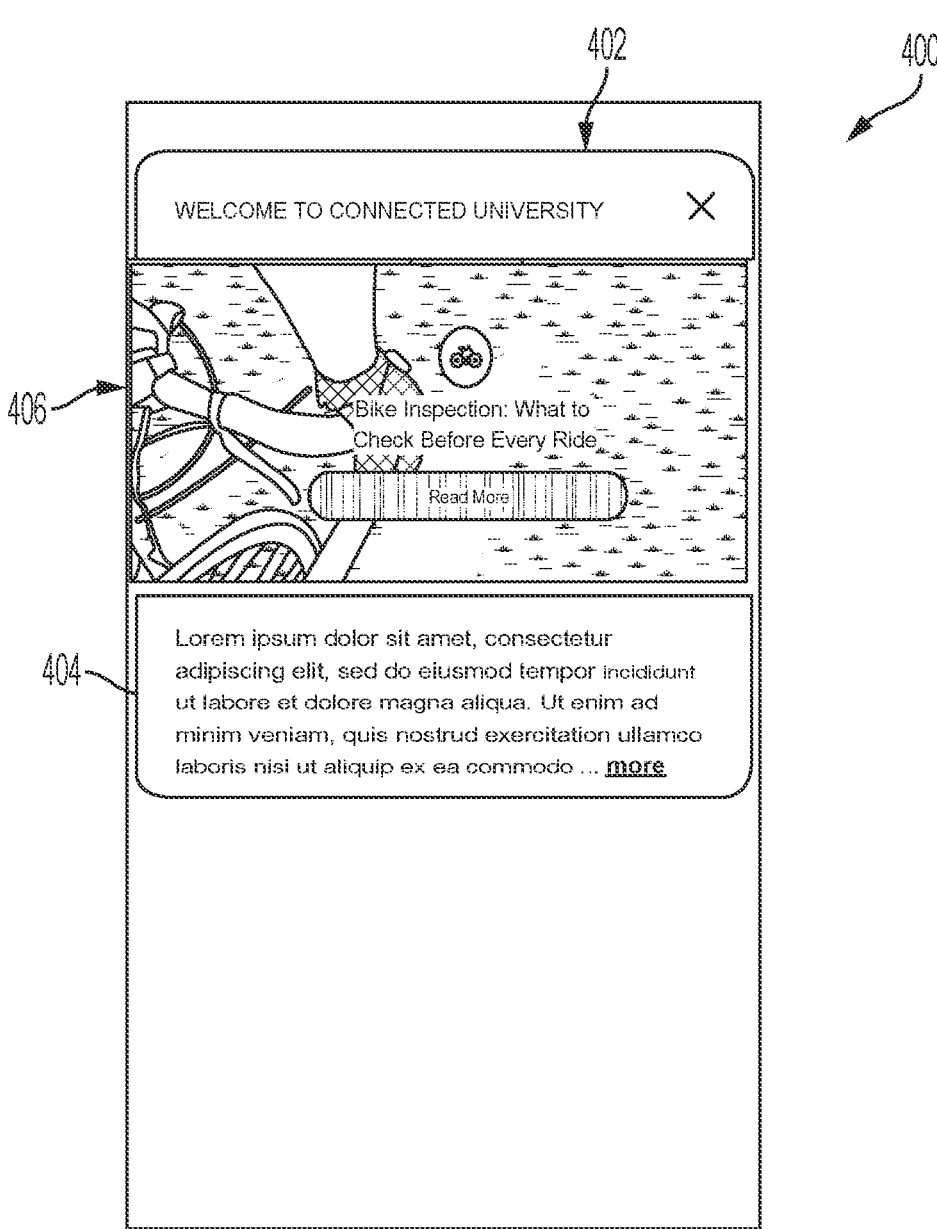

FIG. 3 depicts an example editor GUI display 300 that may be presented by the application platform 124 and/or the message management application 128 within the client application 107 at the client device 106 to allow a user to create or otherwise define an initial version of a message. For example, FIG. 3 depicts an example of creation of an email message. As illustrated, the user may interact with the text boxes, buttons, and other GUI elements of the GUI display 300 to define metadata values for the subject line field, the body field, and other content fields of the email message object to be created. Referring now to FIG. 4, after creation of the email message object, the multichannel message generation process 200 may be performed to create a corresponding version of the email message object that is configured for a push notification communication channel by mapping metadata values from a subset of content fields of the email message object to a newly-created push notification message object. Thereafter, the GUI display presented within the client application 107 at the client device 106 may be updated to provide a graphical representation 400 of the push notification version of the email message created in FIG. 3. As illustrated in FIG. 4, the value for the subject line field 302 of the email message object is copied or otherwise mapped to the title field 402 of the push notification message object, the text from the body field 304 of the email message object is copied or otherwise mapped to the text field 404 of the push notification message object, and the image from the attachment field 306 of the email message object is copied or otherwise mapped to the image field 406 of the push notification message object. After reviewing the autopopulated and autogenerated push notification message 400, the user of the client device 106 may interact with the GUI display presented within the client application 107 to edit or otherwise modify the push notification version of the original message as desired.

Figure 5:
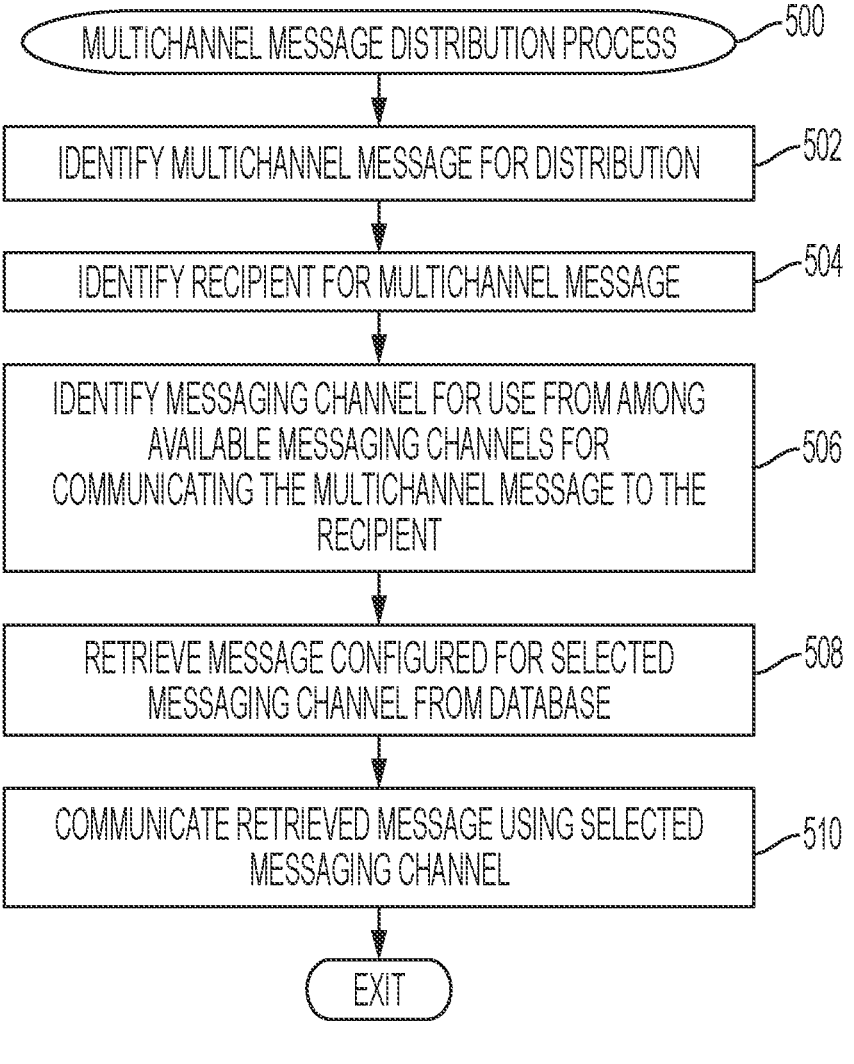
FIG. 5 is a flow diagram of an exemplary multichannel message distribution process suitable for implementation in the computing system of FIG. 1 in conjunction with the multichannel message generation process of FIG. 2 in accordance with one or more embodiments.

FIG. 5 depicts an exemplary embodiment of a multichannel message distribution process 500 suitable for implementation by a database system to communicate different instances of substantially the same message content to different recipients across multiple different communication channels. For illustrative purposes, the following description may refer to elements mentioned above in connection with FIG. 1. While portions of the multichannel message distribution process 500 may be performed by different elements of the computing system 100, for purposes of explanation, the subject matter is described herein in the context of the multichannel message distribution process 500 being primarily performed by the server 102 and/or the database 104. It should be appreciated that the multichannel message distribution process 500 may include any number of additional or alternative tasks, the tasks need not be performed in the illustrated order and/or the tasks may be performed concurrently, and/or the multichannel message distribution process 500 may be incorporated into a more comprehensive procedure or process having additional functionality not described in detail herein. Moreover, one or more of the tasks shown and described in the context of FIG. 5 could be omitted from a practical embodiment of the multichannel message distribution process 500 as long as the intended overall functionality remains intact.

Referring to FIG. 5, with continued reference to FIG. 1, the multichannel message distribution process 500 initializes or otherwise begins by identifying or otherwise determining the multichannel message for distribution and the intended recipient for the identified multichannel message (tasks 502, 504). For example, a user of a client device 106 may interact with the application platform 124 and/or the message management application 128 via the client application 107 to input or otherwise identify the multichannel message 110 that he or she would like to transmit or communicate to other individuals along with the contact information or other identification of those individuals to be communicated with.

Based on the intended recipient and the messaging communication channels supported for the identified multichannel message, the illustrated multichannel message distribution process 500 identifies or otherwise selects the messaging communication channel to be utilized for communicating with the intended recipient from among the supported messaging communication channels (task 506). In this regard, the application platform 124 and/or the message management application 128 may identify personal preferences or other information associated with the intended recipient and utilize that recipient-specific information to identify which of the different messaging communication channels for which an instance of a message object 112, 114 exists in association with the identified multichannel message data structure 110 corresponds to the recipients preferred messaging communication channel or otherwise would be the most effective messaging communication channel for the particular recipient. For example, the database 104 may maintain a contact object associated with the intended recipient that includes or is otherwise associated with preference information, settings information, usage data, engagement data, response data, and the like for that respective recipient, which, in turn may be analyzed by the application platform 124 and/or the message management application 128 to identify which messaging communication channel is most likely to be effectively received by the recipient. In this regard, if an intended recipient does not check his or her email messages frequently but is responsive to push notifications, the application platform 124 and/or the message management application 128 may identify the push notification communication channel for use in communicating with that recipient.

After identifying a preferred or optimal messaging communication channel for a particular recipient, the multichannel message distribution process 500 retrieves or otherwise obtains the existing message that is formatted or otherwise configured for that channel from the database and then transmits or otherwise provides that message to the intended recipient (tasks 508, 510). For example, referring to FIGS. 3-4 with reference to FIG. 1, if the application platform 124 and/or the message management application 128 identifies the push notification channel as the preferred or optimal channel for an intended recipient, the application platform 124 and/or the message management application 128 obtains the push notification message object 114 associated with the identified multichannel message data structure 110. The application platform 124 and/or the message management application 128 may then utilize the individual recipient's name, contact information, and/or other personal information to automatically populate any recipient-specific fields of the template push notification message corresponding to the push notification message object 114 and then transmits or otherwise provides the resulting push notification message via the push notification communication channel (e.g., by providing the push notification message to a push notification application program interface (API) at the server 102 or another server on the network 108), resulting in the graphical representation of the push notification message 400 being presented to that intended recipient. Conversely, for another recipient, the email channel may be identified as the preferred or optimal channel, with the application platform 124 and/or the message management application 128 utilizing that individual's information to automatically populate any recipient-specific fields of the template email message corresponding to the email message object 112 and then transmits or otherwise provides the resulting email message via the email communication channel, resulting in the graphical representation of the email message depicted in FIG. 3 being presented to that intended recipient when he or she views or opens the email message.

For example, in one or more embodiments, a smart send API may be implemented at the server 102 (e.g., as a component of the application platform 124 and/or the message management application 128) that receives the identifier or other identification information associated with the multichannel message data structure 110 along with identifiers or other information indicating the intended recipients for the message. For each identified recipient, the smart send API may analyze historical engagement data associated with the respective recipient and/or the message (e.g., application and/or push notification opens, web clicks, page views, email opens, and the like) to identify the optimal messaging communication channel most likely to maximize engagement or responsiveness for that particular recipient. In this regard, the smart send API may also obtain the contact information associated with a particular recipient from the database 104 (e.g., from the recipient's contact object) and analyze the available contact information with respect to the messaging communication channels supported for the message to identify the optimal messaging communication channel from among the subset of available messaging communication channels which are both supported by the multichannel message data structure and for which the recipient's contact information for that respective channel is available.

In one or more embodiments, a multivariant testing of the potential messaging communication channels for a given multichannel message may be performed to dynamically and adaptively optimize the particular messaging communication channel selection. For example, the multichannel message may be initially sent to a testing subset of the intended recipients (e.g., 5% of the intended recipients) across all the supported messaging communication channels to obtain engagement data for the message with respect to the different messaging communication channels. Thereafter, the per channel engagement data may be input or otherwise provided to the channel selection algorithm(s) as the engagement data associated with the message to adjust the messaging communication channel utilization. For example, a message initially created as an email may be mapped to create corresponding SMS, OTT, push notification, and line message versions. The message may then be sent to a subset of intended recipients using each of the supported channels equally (e.g., by using all supported channels for each recipient or randomly balancing the channel usage across recipients). If the engagement data indicates that the email engagement is relatively low compared to the push notification messaging channel, subsequent iterations of the multichannel message distribution process 500 may prioritize the push notification messaging channel over the email messaging channel for the remaining subset of recipients for which push notification communications are available.

By virtue of the multichannel message generation process 200, an individual message template created and designed by a user for one particular messaging communication channel may be supported across any number of different messaging communication channels, thereby allowing substantially the same underlying message content to be sent to any number of different recipients across any number of different messaging communication channels without requiring the user to manually create or redefine the message for each individual messaging communication channel. Additionally, the multichannel message distribution process 500 is capable of leveraging the multichannel message data structure to send personalized versions of a message to any number of different recipients using the respective messaging communication channel for which each respective recipient is most responsive or engaged, or for which each respective recipient prefers to receive such messages. By logically mapping and reusing metadata values for content fields across different channels, the amount of time and effort required by a user creating or defining the message is reduced relative to other approaches that require creating or defining content for each messaging channel independently of one another, which may also require a user to use different software applications, even though they are trying to communicate the same content. Additionally, supporting the same message content across different communication channels allows for the message to be targeted on a per-recipient basis by messaging communication channel, thereby improving the level of engagement or responsiveness to the message.

In one embodiment, the multichannel message data structure functions as a top-level database object that associates sub-objects (e.g., message database objects) that correspond to the different messaging communication channels that are supported. Metadata values for fields of an initial message object that define the content or attributes of the message, such as title, text, image, button, style, and the like, are mapped from the initial message object to the analogous or corresponding content fields of message objects for other messaging communication channels to be supported. In this regard, when a new messaging communication channel to be supported is selected, indicated, or otherwise added to an existing message, a subset of content fields for the corresponding new message object are automatically populated with metadata values from existing fields of one or more other message objects included or otherwise associated with the multichannel message data structure. Additionally, in some embodiments, when the value for a field of one message object is changed, the mapped, corresponding, or otherwise analogous fields of one or more other message objects corresponding to the other versions of the message configured for other messaging communication channels may be automatically updated (e.g., the user could be prompted to propagate the change or keep it unique to the given channel), thereby allowing the message to be uniformly and dynamically updated across multiple different messaging communication channels at the same time. Thus, a user may avoid having to redundantly enter, type, select, or otherwise input the same information or data for each of the supported channels.

Figure 6:
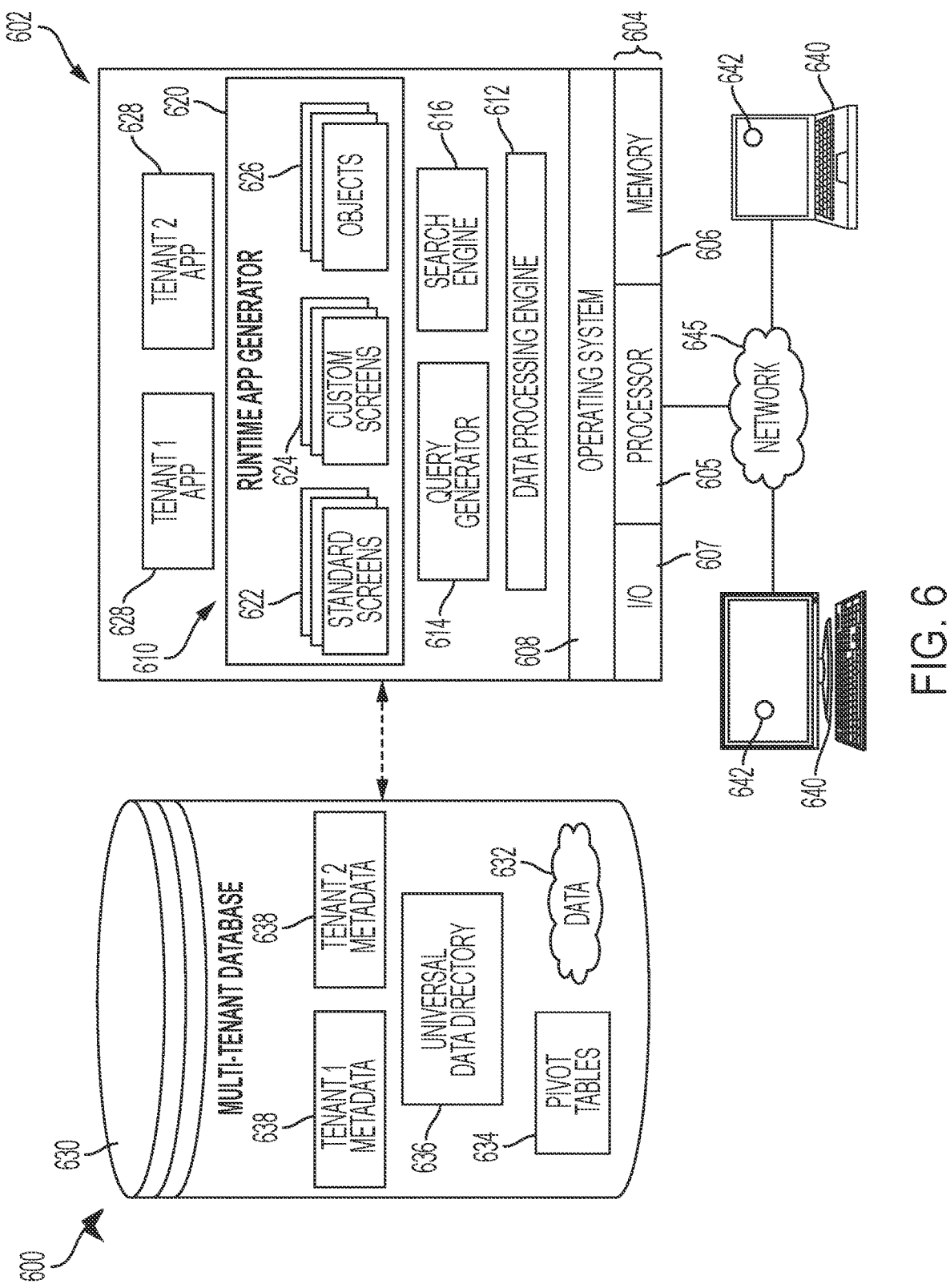
FIG. 6 is a block diagram of an exemplary multi-tenant system suitable for use with the computing system of FIG. 1 in accordance with one or more embodiments.

FIG. 6 depicts an exemplary embodiment of an on-demand multi-tenant database system 600 suitable for use with the computing system 100 of FIG. 1 and the multi-channel messaging processes described herein. The illustrated multi-tenant system 600 of FIG. 6 includes a server 602, such as server 102, that dynamically creates and supports virtual applications 628 based upon data 632 from a common database 630 (e.g., database 104) that is shared between multiple tenants, alternatively referred to herein as a multi-tenant database. Data and services generated by the virtual applications 628 are provided via a network 645 (e.g., network 108) to any number of client devices 640 (e.g., client device 106), as desired. Each virtual application 628 is suitably generated at run-time (or on-demand) using a common application platform 610 (e.g., application platform 124) that securely provides access to the data 632 in the database 630 for each of the various tenants subscribing to the multi-tenant system 600. In accordance with one non-limiting example, the multi-tenant system 600 is implemented in the form of an on-demand multi-tenant customer relationship management (CRM) system that can support any number of authenticated users of multiple tenants.

As used herein, a "tenant" or an "organization" should be understood as referring to a group of one or more users that shares access to common subset of the data within the multi-tenant database 630. In this regard, each tenant includes one or more users associated with, assigned to, or otherwise belonging to that respective tenant. To put it another way, each respective user within the multi-tenant system 600 is associated with, assigned to, or otherwise belongs to a particular tenant of the plurality of tenants supported by the multi-tenant system 600. Tenants may represent customers, customer departments, business or legal organizations, and/or any other entities that maintain data for particular sets of users within the multi-tenant system 600 (i.e., in the multi-tenant database 630). For example, the application server 602 may be associated with one or more tenants supported by the multi-tenant system 600. Although multiple tenants may share access to the server 602 and the database 630, the particular data and services provided from the server 602 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 632 belonging to or otherwise associated with other tenants.

The multi-tenant database 630 is any sort of repository or other data storage system capable of storing and managing the data 632 associated with any number of tenants. The database 630 may be implemented using any type of conventional database server hardware. In various embodiments, the database 630 shares processing hardware 604 with the server 602. In other embodiments, the database 630 is implemented using separate physical and/or virtual database server hardware that communicates with the server 602 to perform the various functions described herein. In an exemplary embodiment, the database 630 includes a database management system or other equivalent software capable of determining an optimal query plan for retrieving and providing a particular subset of the data 632 to an instance of virtual application 628 in response to a query initiated or otherwise provided by a virtual application 628. The multi-tenant database 630 may alternatively be referred to herein as an on-demand database, in that the multi-tenant database 630 provides (or is available to provide) data at run-time to on-demand virtual applications 628 generated by the application platform 610.

In practice, the data 632 may be organized and formatted in any manner to support the application platform 610. In various embodiments, the data 632 is suitably organized into a relatively small number of large data tables to maintain a semi-amorphous "heap"-type format. The data 632 can then be organized as needed for a particular virtual application 628. In various embodiments, conventional data relationships are established using any number of pivot tables 634 that establish indexing, uniqueness, relationships between entities, and/or other aspects of conventional database organization as desired. Further data manipulation and report formatting is generally performed at run-time using a variety of metadata constructs. Metadata within a universal data directory (UDD) 636, for example, can be used to describe any number of forms, reports, workflows, user access privileges, business logic and other constructs that are common to multiple tenants. Tenant-specific formatting, functions and other constructs may be maintained as tenant-specific metadata 638 for each tenant, as desired. Rather than forcing the data 632 into an inflexible global structure that is common to all tenants and applications, the database 630 is organized to be relatively amorphous, with the pivot tables 634 and the metadata 638 providing additional structure on an as-needed basis. To that end, the application platform 610 suitably uses the pivot tables 634 and/or the metadata 638 to generate "virtual" components of the virtual applications 628 to logically obtain, process, and present the relatively amorphous data 632 from the database 630.

Still referring to FIG. 6, the server 602 is implemented using one or more actual and/or virtual computing systems that collectively provide the dynamic application platform 610 for generating the virtual applications 628. For example, the server 602 may be implemented using a cluster of actual and/or virtual servers operating in conjunction with each other, typically in association with conventional network communications, cluster management, load balancing and other features as appropriate. The server 602 operates with any sort of conventional processing hardware 604, such as a processor 605, memory 606, input/output features 607 and the like. The input/output features 607 generally represent the interface(s) to networks (e.g., to the network 645, or any other local area, wide area or other network), mass storage, display devices, data entry devices and/or the like. The processor 605 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 606 represents any non-transitory short or long-term storage or other computer-readable media capable of storing programming instructions for execution on the processor 605, including any sort of random-access memory (RAM), read only memory (ROM), flash memory, magnetic or optical mass storage, and/or the like. The computer-executable programming instructions, when read and executed by the server 602 and/or processor 605, cause the server 602 and/or processor 605 to create, generate, or otherwise facilitate the application platform 610 and/or virtual applications 628 and perform one or more additional tasks, operations, functions, and/or processes described herein. It should be noted that the memory 606 represents one suitable implementation of such computer-readable media, and alternatively or additionally, the server 602 could receive and cooperate with external computer-readable media that is realized as a portable or mobile component or application platform, e.g., a portable hard drive, a USB flash drive, an optical disc, or the like.

The application platform 610 is any sort of software application or other data processing engine that generates the virtual applications 628 that provide data and/or services to the client devices 640. In a typical embodiment, the application platform 610 gains access to processing resources, communications interfaces and other features of the processing hardware 604 using any sort of conventional or proprietary operating system 608. The virtual applications 628 are typically generated at run-time in response to input received from the client devices 640. For the illustrated embodiment, the application platform 610 includes a bulk data processing engine 612, a query generator 614, a search engine 616 that provides text indexing and other search functionality, and a runtime application generator 620. Each of these features may be implemented as a separate process or other module, and many equivalent embodiments could include different and/or additional features, components or other modules as desired.

The runtime application generator 620 dynamically builds and executes the virtual applications 628 in response to specific requests received from the client devices 640. The virtual applications 628 are typically constructed in accordance with the tenant-specific metadata 638, which describes the particular tables, reports, interfaces and/or other features of the particular application 628. In various embodiments, each virtual application 628 generates dynamic web content that can be served to a browser or other client program 642 associated with its client device 640, as appropriate.

The runtime application generator 620 suitably interacts with the query generator 614 to efficiently obtain multi-tenant data 632 from the database 630 as needed in response to input queries initiated or otherwise provided by users of the client devices 640. In a typical embodiment, the query generator 614 considers the identity of the user requesting a particular function (along with the user's associated tenant), and then builds and executes queries to the database 630 using system-wide metadata 636, tenant specific metadata 638, pivot tables 634, and/or any other available resources. The query generator 614 in this example therefore maintains security of the common database 630 by ensuring that queries are consistent with access privileges granted to the user and/or tenant that initiated the request. In this manner, the query generator 614 suitably obtains requested subsets of data 632 accessible to a user and/or tenant from the database 630 as needed to populate the tables, reports or other features of the particular virtual application 628 for that user and/or tenant.

Still referring to FIG. 6, the data processing engine 612 performs bulk processing operations on the data 632 such as uploads or downloads, updates, online transaction processing, and/or the like. In many embodiments, less urgent bulk processing of the data 632 can be scheduled to occur as processing resources become available, thereby giving priority to more urgent data processing by the query generator 614, the search engine 616, the virtual applications 628, etc.

In exemplary embodiments, the application platform 610 is utilized to create and/or generate data-driven virtual applications 628 for the tenants that they support. Such virtual applications 628 may make use of interface features such as custom (or tenant-specific) screens 624, standard (or universal) screens 622 or the like. Any number of custom and/or standard objects 626 may also be available for integration into tenant-developed virtual applications 628. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 626 such as "account" objects, "opportunity" objects, "contact" objects, or the like. The data 632 associated with each virtual application 628 is provided to the database 630, as appropriate, and stored until it is requested or is otherwise needed, along with the metadata 638 that describes the particular features (e.g., reports, tables, functions, objects, fields, formulas, code, etc.) of that particular virtual application 628. For example, a virtual application 628 may include a number of objects 626 accessible to a tenant, wherein for each object 626 accessible to the tenant, information pertaining to its object type along with values for various fields associated with that respective object type are maintained as metadata 638 in the database 630. In this regard, the object type defines the structure (e.g., the formatting, functions and other constructs) of each respective object 626 and the various fields associated therewith.

Still referring to FIG. 6, the data and services provided by the server 602 can be retrieved using any sort of personal computer, mobile telephone, tablet or other network-enabled client device 640 on the network 645. In an exemplary embodiment, the client device 640 includes a display device, such as a monitor, screen, or another conventional electronic display capable of graphically presenting data and/or information retrieved from the multi-tenant database 630. Typically, the user operates a conventional browser application or other client program 642 (e.g., client application 107) executed by the client device 640 to contact the server 602 via the network 645 using a networking protocol, such as the hypertext transport protocol (HTTP) or the like. The user typically authenticates his or her identity to the server 602 to obtain a session identifier ("SessionID") that identifies the user in subsequent communications with the server 602. When the identified user requests access to a virtual application 628, the runtime application generator 620 suitably creates the application at run time based upon the metadata 638, as appropriate. As noted above, the virtual application 628 may contain Java, ActiveX, or other content that can be presented using conventional client software running on the client device 640; other embodiments may simply provide dynamic web or other content that can be presented and viewed by the user, as desired.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to web pages and/or browsers, email, text messaging, SMS messaging, OTT messaging, line messaging, push notifications, artificial intelligence, machine learning, targeting, APIs, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of managing data in a database system, the method comprising:

providing a graphical user interface (GUI) within a client application, the GUI including a graphical representation of a first electronic message having metadata for one or more content fields in a first data format associated with a first communication channel and a GUI element for obtaining user indication of a second communication channel different from the first communication channel;

obtaining, via the GUI element, the user indication of the second communication channel to convert the first electronic message to a second data format for the second communication channel, the second data format being different from the first data format;

identifying the one or more content fields of the first electronic message configured for the first communication channel that logically map to a subset of content fields of a new message configured for the second communication channel;

automatically populating the subset of content fields of the new message using the metadata for the one or more content fields mapped to the subset of content fields of the second data format corresponding to the one or more content fields of the first electronic message having the first data format; and providing, via the GUI, a graphical representation of the new message having the second data format configured to be delivered via the second communication channel using the subset of content fields of the new message, wherein the graphical representation of the new message comprises at least some content the same as the first electronic message having the first data format associated with the first communication channel.

2. The method of claim 1, wherein obtaining the user indication comprises obtaining user input selecting a destination messaging communication channel for the first electronic message from within the GUI.

3. The method of claim 2, wherein the destination messaging communication channel comprises email.

4. The method of claim 3, wherein the GUI comprises a second GUI element to edit a subject field of the new message.

5. The method of claim 4, wherein the first communication channel comprises an application-based messaging channel.

6. The method of claim 1, wherein providing the graphical representation comprises providing the graphical representation of the new message within the GUI for review by a user prior to transmitting the new message via the second communication channel.

7. The method of claim 6, wherein the graphical representation of the new message within the GUI depicts the new message as it would be presented upon receipt via the second communication channel.

8. The method of claim 7, wherein the GUI comprises one or more GUI elements for at least one of modifications, additions and edits to the subset of content fields of the new message.

9. The method of claim 1, wherein automatically populating the subset of content fields comprises automatically mapping common metadata for the one or more content fields in the first data format to the subset of content fields of the new message.

10. The method of claim 1, wherein the graphical representation of the new message comprises the same content as the first electronic message having the first data format associated with the first communication channel.

11. The method of claim 1, wherein the GUI comprises one or more GUI elements that allow a user to define the metadata for the one or more content fields in the first data format associated with the first communication channel.

12. The method of claim 11, further comprising providing a second GUI element within the GUI that allows the user to select the first communication channel as a desired messaging communication channel.

13. The method of claim 1, further comprising retrieving the first electronic message comprising an existing message in a database of the database system prior to automatically populating the subset of content fields of the new message using the metadata for the one or more content fields of the existing message in the database of the database system.

14. At least one non-transitory computer-readable medium having instructions stored thereon that, when executed, are configurable to cause at least one processing system to:

provide a graphical user interface (GUI) within a client application, the GUI including a graphical representation of a first electronic message having metadata for one or more content fields in a first data format associated with a first communication channel and a GUI element for obtaining user indication of a second communication channel different from the first communication channel;

obtain, via the GUI element, the user indication of the second communication channel to convert the first electronic message to a second data format for the second communication channel, the second data format being different from the first data format;

identify the one or more content fields of the first electronic message configured for the first communication channel that logically map to a subset of content fields of a new message configured for the second communication channel;

automatically populate the subset of content fields of the new message using the metadata for the one or more content fields mapped to the subset of content fields of the second data format corresponding to the one or more content fields of the first electronic message having the first data format; and provide, via the GUI, a graphical representation of the new message having the second data format configured to be delivered via the second communication channel using the subset of content fields of the new message, wherein the graphical representation of the new message comprises at least some content the same as the first electronic message having the first data format associated with the first communication channel.

15. The at least one non-transitory computer-readable medium of claim 14, wherein obtaining the user indication comprises obtaining user input selecting a destination messaging communication channel for the first electronic message from within the GUI at the client application.

16. The at least one non-transitory computer-readable medium of claim 15, wherein the destination messaging communication channel comprises email.

17. The at least one non-transitory computer-readable medium of claim 16, wherein the GUI comprises a second GUI element to edit a subject field of the new message.

18. The at least one non-transitory computer-readable medium of claim 17, wherein the first communication channel comprises an application-based messaging channel.

19. The at least one non-transitory computer-readable medium of claim 14, wherein the instructions are configurable to cause the at least one processing system to provide the graphical representation of the new message within the GUI for review by a user prior to transmitting the new message via the second communication channel.

20. At least one non-transitory computer-readable medium having instructions stored thereon that, when executed, are configurable to cause at least one processing system to:

obtain metadata for a first plurality of content fields for a first message corresponding to a first instance of an electronic message having a first data format associated with a first communication channel;

identify a second communication channel for the electronic message, the second communication channel being different from the first communication channel and having associated therewith a second data format different from the first data format, the second data format including a second plurality of content fields defining messages for the second communication channel that are different from the first plurality of content fields;

automatically map a subset of the metadata of the first plurality of content fields of the first message having the first data format to a corresponding subset of a second plurality of content fields of a second message having the second data format;

thereafter create the second message corresponding to a second instance of the electronic message in the second data format associated with the second communication channel by automatically populating the corresponding subset of the second plurality of content fields of the second message using copied metadata formatted in accordance with the second data format in association with the second communication channel; and present a graphical representation corresponding to receipt of the second instance of the electronic message via the second communication channel using the subset of the second plurality of content fields of the second message, wherein the graphical representation comprises the same content as the first instance of the electronic message having the first data format associated with the first communication channel.

\* \* \* \* \*